Dec. 16, 1958    D. E. DAVIDSON ET AL    2,864,657
BEARING HANGER
Filed March 22, 1957
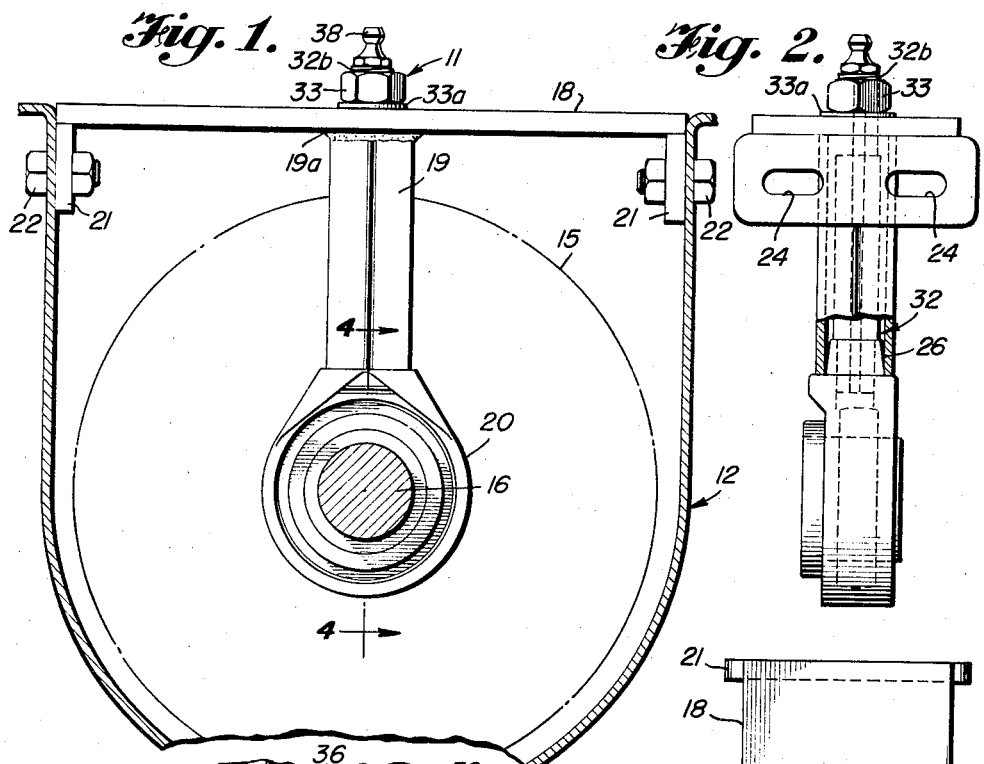
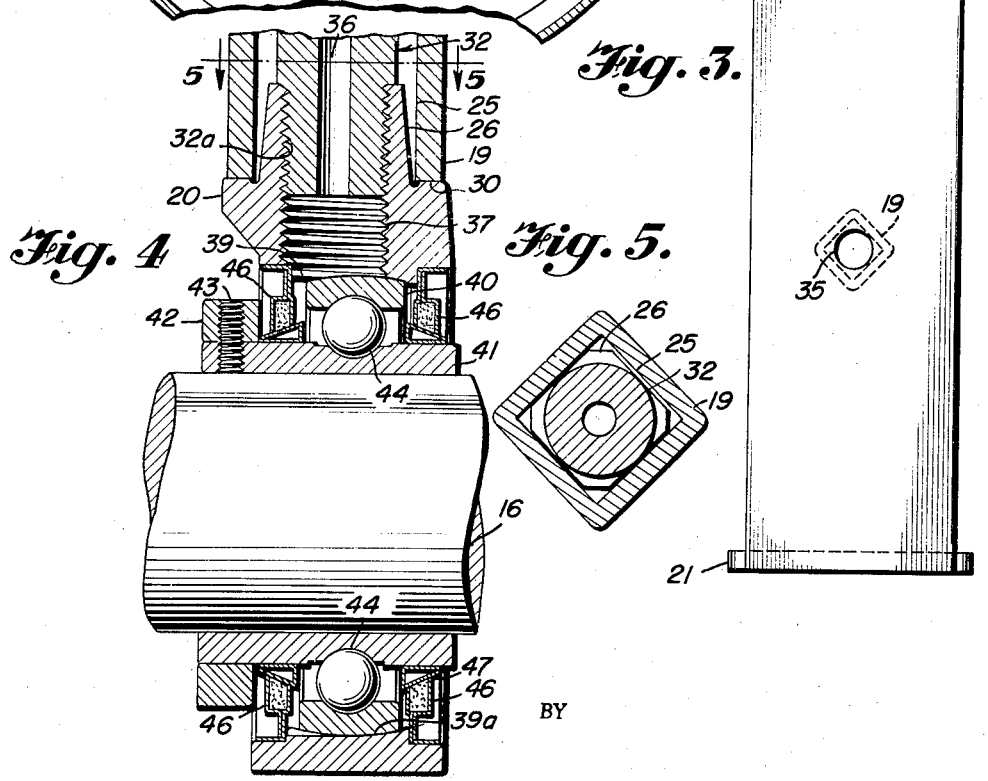

Patented Dec. 16, 1958

2,864,657

BEARING HANGER

David E. Davidson, Flossmoor, and Bert B. Parshall, Wood Dale, Ill., and Donald E. Thal, San Mateo, Calif., assignors to Link-Belt Company, a corporation of Illinois Application March 22, 1957, Serial No. 647,808

6 Claims. (Cl. 308—187)

This invention relates to bearing hangers and deals more particularly with such hangers when employed for supporting the conveyor screws of screw conveyor units.

It is the primary object of this invention to provide a bearing hanger for conveyor screws which is so constructed of a few basic parts that it may be quickly and easily assembled and disassembled for maintenance and repair purposes.

A further object of the invention is to provide a bearing hanger of the above mentioned type which may be used for supporting differently diametered conveyor screws and screw shafts in differently dimensioned troughs by interchangeably employing differently dimensioned basic parts.

Other objects and advantages of the invention will be apparent during the course of the following description.

In the accompanying drawing forming a part of this specification and in which like reference characters are employed to designate like parts throughout the same, Figure 1 is an end elevational view of a bearing hanger embodying the present invention shown positioned in the trough of a screw conveyor, Figure 2 is a side elevational view, partly broken away, of the bearing hanger shown in Fig. 1, Figure 3 is a top plan view of the bearing hanger shown in Fig. 1, Figure 4 is an enlarged, vertical sectional view taken along line 4—4 of Fig. 1, and Figure 5 is a transverse sectional view taken along line 5—5 of Fig. 4.

In the drawing, wherein for the purpose of illustration is shown the preferred embodiment of this invention, and first particularly referring to Fig. 1, there is shown a bearing hanger 11 mounted in place in the trough 12 of a screw conveyor. The broken circular line 15 represents the peripheral edge portions of the conveyor screw and indicates the position assumed by the screw in respect to the trough. Bearing hangers are employed in screw conveyors when their lengths are such that the conveyor screws must be formed of two or more sections. In such a situation, each two adjacent sections of the screw are usually connected by a relatively short coupling shaft which is free of any part of the screw flight. Therefore, the bearing hanger rotatably supports the screw by journaling the coupling shaft which is designated 16 in Figs. 1 and 4.

Viewed as in Fig. 1, the bearing hanger 11 basically consists of a flat horizontal crossbar 18, a tubular spacer 19 depending from the crossbar and a bearing housing 20 at the lower end of the spacer.

The flat crossbar 18, spanning the side walls of the trough 12, serves as a mount or support for the remaining elements of the bearing hanger 11, and is adapted for attachment to the trough by vertical side brackets 21 rigidly connected, by welding or otherwise, to the extreme ends of the crossbar. Fastening means, such as bolts 22, extending through the side walls and the brackets, secure the crossbar to the trough. For receiving the bolts 22 the brackets 21 are preferably formed with aligned elongated slots 24 to allow the bearing hanger 11 to be shifted longitudinally along the trough in order to properly position the hanger when attaching it to the trough.

The tubular spacer 19 is of square or rectangular shape in cross section and is provided with a bore 25 of the same cross section. The upper end of the square or rectangular spacer is welded at 19a to the crossbar 18 in such a position that two of the longitudinal edges or corners are facing upstream and downstream, respectively, of the direction of movement of the material through the trough 12.

The housing 20 is fitted onto the free end of the spacer 19 by forming an upstanding boss 26 of square or rectangular cross section on the exterior surface of the housing dimensioned to fit the bore 25. In order to facilitate assembling the housing on the spacer, the boss 26 is tapered, as shown in Fig. 4. The housing 20 is formed with a flat surface 30 around the boss 26 to provide a seat for the lower end of the spacer 19.

The bearing housing 20 is connected to the lower end of the spacer 19 by means of a section of pipe 32 that is threaded at both of its end portions 32a and 32b. The lower end portion 32a is threaded into the bore of the housing boss 26 while the upper end 32b passes through a hole in the cross-bar 18 for connection with a nut 33 that bears against a washer 33a. By tightening down on the nut 33, the bearing housing 20, which is threadedly connected to the lower end portion 32a of the pipe section, will be drawn tightly against the spacer 19.

The bore 36 of the pipe section 32 communicates with the unoccupied portion 37 of the bore of the boss 26 for feeding lubricant to the interior of the bearing housing 20. A grease fitting 38 is connected to the upper end of the pipe section 32 for supplying lubricant to the pipe bore 36.

The bearing housing 20 is of a single piece, or solideye type, which may be shaped internally to receive either a plain or an antifriction bearing for journaling the coupling shaft 16. However, a self-aligning, ball bearing unit has been selected for illustration in the drawing.

In Fig. 4, the eye of the bearing housing 20 is illustrated as being formed with a concave interior surface 39 for cooperating with the convex exterior surface 39a of the bearing outer race ring 40. The inner race ring 41 of the bearing is fitted over the coupling shaft 16 and is fastened thereto by means of the collar 42 and the set screw 43, as seen in Fig. 4. A series of balls 44 is positioned in the grooves of the rings 40 and 41 and function in the customary manner.

Bearing seals 46 suitable for accommodating the self-aligning action of the bearing are positioned on both sides of the latter between the inner race ring 41 and the bearing housing 20.

It is to be understood that the form of this invention herewith shown and described is to be taken as the preferred example of the same, and that various changes in the shape, size and arrangement of parts may be resorted to without departing from the spirit of the invention or the scope of the subjoined claims.

Having thus described the invention, we claim:

1. A bearing hanger comprising a mounting bracket adapted for attachment to the trough of a screw conveyor, a tubular spacer centrally secured to said mounting bracket, a bearing housing positioned on the free end of said spacer, a pipe section rigidly connected to said bearing housing and having a hollow bore in communication with the interior of said bearing housing, said pipe section being disposed within said spacer and extending above said bracket, and a clamping nut threaded on the free end of said pipe section for drawing said housing tightly against the bottom of said spacer.

2. A bearing hanger comprising a mounting bracket adapted for attachment to the trough of a screw conveyor, a tubular spacer rigidly connected to said mounting bracket and formed with a bore of polygonal cross section, a bearing housing carried on the free end of said spacer having a corresponding polygonal boss dimensioned to fit said polygonal bore to properly position said bearing housing on said spacer, and means for fastening together said mounting bracket, said spacer and said housing.

3. A bearing hanger comprising a mounting bracket adapted for attachment to the trough of a screw conveyor, a tubular spacer rigidly connected to said mounting bracket and formed with a bore of polygonal cross section, a bearing housing carried on the free end of said spacer having a corresponding polygonal boss dimensioned to fit said polygonal bore to properly position said bearing housing on said spacer, a pipe section fastened to said boss, said pipe section being enclosed within said spacer and having a threaded end portion extending through said mounting bracket, and a clamping nut threaded on said end portion for drawing said housing tightly against the free end of said spacer.

4. A bearing hanger comprising a mounting bracket adapted for attachment to the trough of a screw conveyor, a tubular spacer connected to said mounting bracket and formed with a polygonal bore, a bearing housing carried on the free end of said spacer having a corresponding polygonal boss fitting said bore to properly position said housing on said spacer with respect to said bracket, said boss being formed with a bore therethrough communicating with the interior of said housing, a pipe section fastened to said boss with its bore in communication with said housing, said pipe section being disposed within said spacer and having a threaded end portion extending through said mounting bracket, and a clamping nut threaded on said pipe section for drawing said housing tightly against the bottom of said spacer.

5. A bearing hanger comprising a flat crossbar having a bracket rigidly connected to each of its ends for attachment to a screw conveyor trough, a depending length of square tubing rigidly connected to the center of said crossbar with two diametrically opposed corners aligned with the longitudinal axis of said crossbar, a bearing housing carried on the free end of said square tubing and having a square boss fitting the interior of said square tubing, said boss being positioned with two diametrically opposed corners aligned with the axis of said housing, a connecting pipe threaded into said square boss and disposed within said square tubing, said connecting pipe having a threaded top portion extending through said crossbar, and the bore of said pipe being in communication with a grease opening formed in said housing, and a retaining nut threaded on the top portion of said pipe for drawing said housing tightly against said spacer.

6. A bearing hanger as defined in claim 5 further characterized by said bearing housing being a solid single piece member, and a self-aligning antifriction bearing positioned in said housing.

References Cited in the file of this patent
UNITED STATES PATENTS 2,557,562   Raught _____ June 19, 1951

FOREIGN PATENTS 594,703   Germany _____ Mar. 21, 1934